United States Patent
Chen et al.

(10) Patent No.: US 12,519,586 B2
(45) Date of Patent: Jan. 6, 2026

(54) NETWORKING SIGNAL SENDING METHOD AND DEVICE FOR POSITIONING NETWORK

(71) Applicant: ZTE Corporation, Shenzhen (CN)

(72) Inventors: Shijun Chen, Shenzhen (CN); Dawei Chen, Shenzhen (CN); Yang Wang, Shenzhen (CN); Junqiang Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 500 days.

(21) Appl. No.: 17/917,015

(22) PCT Filed: Mar. 15, 2021

(86) PCT No.: PCT/CN2021/080823
§ 371 (c)(1),
(2) Date: Oct. 5, 2022

(87) PCT Pub. No.: WO2021/213072
PCT Pub. Date: Oct. 28, 2021

(65) Prior Publication Data
US 2023/0198701 A1 Jun. 22, 2023

(30) Foreign Application Priority Data
Apr. 24, 2020 (CN) .......................... 202010334389.9

(51) Int. Cl.
*H04W 4/029* (2018.01)
*G01S 5/02* (2010.01)
*H04L 5/00* (2006.01)

(52) U.S. Cl.
CPC .......... *H04L 5/0048* (2013.01); *G01S 5/0226* (2013.01); *H04L 5/008* (2013.01)

(58) Field of Classification Search
CPC ..... H04W 64/00; H04W 16/28; H04W 24/10; H04W 64/006; H04W 64/003;
(Continued)

(56) References Cited

U.S. PATENT DOCUMENTS

| 9,351,111 | B1 | 5/2016 | Kaufman et al. | |
| 2013/0084884 | A1* | 4/2013 | Teyeb | H04W 48/04 455/456.1 |

(Continued)

FOREIGN PATENT DOCUMENTS

| CN | 103592629 A | 2/2014 |
| CN | 103703385 A | 4/2014 |

(Continued)

OTHER PUBLICATIONS

International Search Report for corresponding application PCT/CN2021/080823 filed Mar. 15, 2021; Mail date Jun. 3, 2021.

(Continued)

*Primary Examiner* — Quan M Hua
(74) *Attorney, Agent, or Firm* — CANTOR COLBURN LLP (57) ABSTRACT

Provided are a networking signal sending method and device for a positioning network. The method includes: determining a networking mode of the positioning network according to an application scene, wherein the networking mode includes independent networking of the positioning network and joint networking of the positioning network and a communication network; and configuring a positioning base station of the positioning network, or the positioning base station and a communication base station according to the networking mode, wherein the positioning base station is used for sending a positioning signal or the positioning signal and a synchronization signal, and the communication base station is used for sending the synchronization signal.

16 Claims, 6 Drawing Sheets

(58) Field of Classification Search
CPC . H04W 72/04; H04W 72/0453; H04W 72/23; H04W 4/02; H04W 4/029; H04W 88/02; H04W 92/18; H04W 16/00; H04W 16/14; H04W 24/08; H04W 4/70; H04W 56/00; H04W 56/001; H04W 56/0035; H04W 72/231; H04W 76/27; H04W 88/04; H04W 88/08; H04W 16/18; H04W 16/24; H04W 28/02; H04W 36/08; H04W 4/025; H04W 48/12; H04W 48/16; H04W 72/00; H04W 72/232

See application file for complete search history.

(56) References Cited

U.S. PATENT DOCUMENTS

| | | | | |
|---|---|---|---|---|
| 2013/0336224 | A1* | 12/2013 | Davydov | H04W 4/70 370/328 |
| 2015/0365790 | A1* | 12/2015 | Edge | H04W 76/50 455/456.1 |
| 2016/0337805 | A1* | 11/2016 | Liao | H04W 8/005 |
| 2017/0078011 | A1* | 3/2017 | Kim | H04W 72/20 |
| 2017/0318553 | A1 | 11/2017 | Chen et al. | |
| 2017/0339660 | A1 | 11/2017 | Kazmi et al. | |
| 2019/0364535 | A1 | 11/2019 | Sadiq | |

FOREIGN PATENT DOCUMENTS

| | | |
|---|---|---|
| CN | 105636193 A | 6/2016 |
| CN | 107589401 A | 1/2018 |
| CN | 108990146 A | 12/2018 |
| CN | 109819396 A | 5/2019 |
| CN | 109819513 A | 5/2019 |
| CN | 110365455 A | 10/2019 |
| CN | 110999434 A | 4/2020 |
| CN | 111866894 A | 10/2020 |
| WO | 2016019522 A1 | 2/2016 |

OTHER PUBLICATIONS

Chinese Search Report for Application No. 2020103343899, 1 page.
European Search Report for Application No. 21791965.3, dated Dec. 7, 2023, 9 pages.

* cited by examiner

NETWORKING SIGNAL SENDING METHOD AND DEVICE FOR POSITIONING NETWORK

CROSS-REFERENCE TO RELATED APPLICATION

The present disclosure claims priority to Chinese patent application No. CN202010334389.9, filed on Apr. 24, 2020, and entitled "Networking signal sending method and device for positioning network", the disclosure of which is hereby incorporated by reference in its entirety.

TECHNICAL FIELD

The present disclosure relates to the field of communication, in particular to a networking signal sending method and device for a positioning network.

Background

Location information plays a more and more important role in intellectual technology, and accurate location information serves as a premise for current typical emerging market applications such as intelligent taxi, bicycle sharing, automatic drive and personnel management.

Current main positioning technologies come from Beidou and GPS (Global Positioning System). A global positioning system can provide sphere positioning, and open environment positioning precision can reach 10 m-20 m, which can basically meet most of positioning requirements. But, the global positioning system cannot cover indoor and city commercial districts with dense tall buildings due to path losses caused by the long distance. While the two types of environments are scenes with densest commercial activity and people activity.

Figure 1:
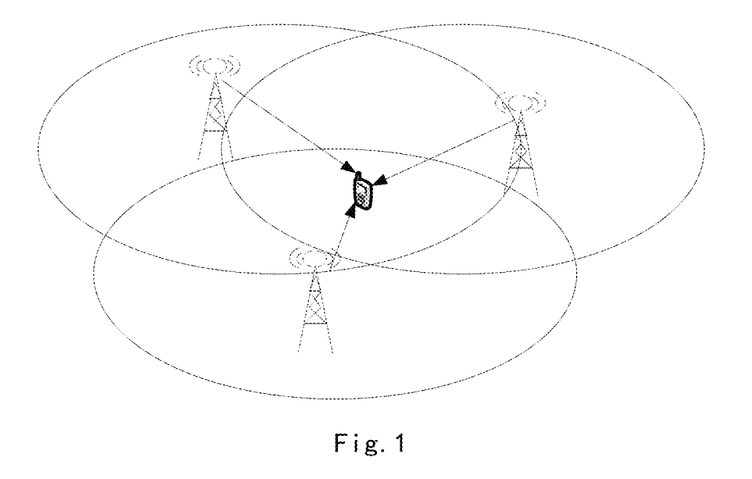
FIG. 1 is a schematic diagram of a positioning system based on a communication base station in related technologies.
Figure 2:
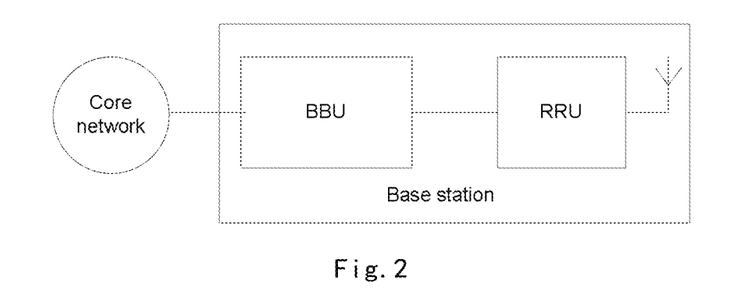
FIG. 2 is a structure chart of a base station in the related technologies.

To solve indoor and urban area positioning problems, people provide many positioning methods such as wifi, uwb, bluetooth and inertial navigation, but the technologies have common defects that only small-range positioning can be finished. To solve the wide area indoor high-precision positioning problem, FIG. 1 is a schematic diagram of a positioning system based on a communication base station in related technologies, as shown in FIG. 1, a wireless communication network with good coverage is hoped to integrally provide a high-precision positioning function, and the positioning system of the communication base station is utilized for positioning. FIG. 2 is a structure chart of the base station according to the related technologies, as shown in FIG. 2, 4G and 5G wireless communication networks essentially are a cellular network, a typical structure of the communication base station is commonly at least composed of a base band unit and a radio frequency unit, and each part has a complex system inside. Internal signal transmission of the base station brings large time jitter due to complexity of the system. The jigger causes poor synchronization performance of signal transmission of various base station antenna ports, and a current 3gpp standard requires a coincident indicator among base stations to be 2us. The coincident indicator commonly meets common communication functions, but the coincident indicator may introduce a measuring error of 600 m for the main positioning technology OTDOA. Meanwhile, positioning through the base stations may cause increasing of base station layout density and bring a bigger cost problem.

For the problems that the base station layout density is increased and the networking cost is increased due to communication base station positioning in the related technologies, no solutions are proposed yet.

SUMMARY

The embodiment of the present disclosure provides a channel state information reference signal transmission method and device so as to at least solve the problems that the base station layout density is increased and the networking cost is increased due to communication base station positioning in the related technologies.

According to an embodiment of the present disclosure, a networking signal sending method for a positioning network is provided and comprises:
  determining a networking mode of the positioning network according to an application scene, wherein the networking mode includes independent networking of the positioning network and joint networking of the positioning network and a communication network; and
  configuring a positioning base station of the positioning network, or the positioning base station and a communication base station according to the networking mode, wherein the positioning base station is used for sending a positioning signal or the positioning signal and a synchronization signal, and the communication base station is used for sending the synchronization signal.

According to another embodiment of the present disclosure, a networking signal sending device for a positioning network is further provided and comprises:
  a determination module configured to determine a networking mode of a positioning network according to an application scene, wherein the networking mode includes independent networking of the positioning network and joint networking of the positioning network and a communication network; and
  a configuration module configured to configure a positioning base station of the positioning network, or the positioning base station and a communication base station according to the networking mode, wherein the positioning base station is used for sending a positioning signal or the positioning signal and a synchronization signal, and the communication base station is used for sending the synchronization signal.

According to another embodiment of the present disclosure, a computer readable storage medium is further provided, and the storage medium stores computer programs, wherein the computer programs are configured to perform steps in the embodiment of any above method during operation.

According to another embodiment of the present disclosure, an electronic device is further provided and includes a memory and a processor, the memory stores computer programs, and the processor is configured to execute the computer programs so as to perform steps in the embodiment of any above method.

By means of the present disclosure, a networking mode of the positioning network is determined according to an application scene, wherein the networking mode includes independent networking of the positioning network and joint networking of the positioning network and a communication network; and a positioning base station of the positioning network, or the positioning base station and a communication base station are configured according to the networking mode, wherein the positioning base station is used for sending a positioning signal or the positioning signal and a synchronization signal, and the communication base station is used for sending the synchronization signal. The problems that the base station layout density is increased and the networking cost is increased due to communication base station positioning in the related technologies can be solved. The positioning base station of the positioning network is used for sending the positioning signal so that positioning function networking can be independently finished, the positioning base station and the communication base station can be networked in a joint mode, so that networking flexibility of the positioning network is kept, and positioning base station positioning has lower networking cost and higher positioning precision compared with communication base station positioning.

BRIEF DESCRIPTION OF THE DRAWINGS

Drawings illustrated herein are used for providing further understanding for the present disclosure and form a part of the present disclosure. Schematic embodiments and explanations of the schematic embodiments of the present disclosure are used for explaining the present disclosure and do not form improper limitation for the present disclosure. In the drawings.

DETAILED DESCRIPTION OF THE EMBODIMENTS

The present disclosure is described in detail in reference to drawings and in combination with the embodiments as below. It needs to be explained that under the non-conflict situation, embodiments in the present disclosure and features of the embodiments can be mutually combined.

It needs to be explained that terms such as "first" and "second" of the Description, Claims and the above drawings of the present disclosure are used for distinguishing similar objects but not used for describing specific sequences or precedence orders.

Embodiment 1

Figure 3:
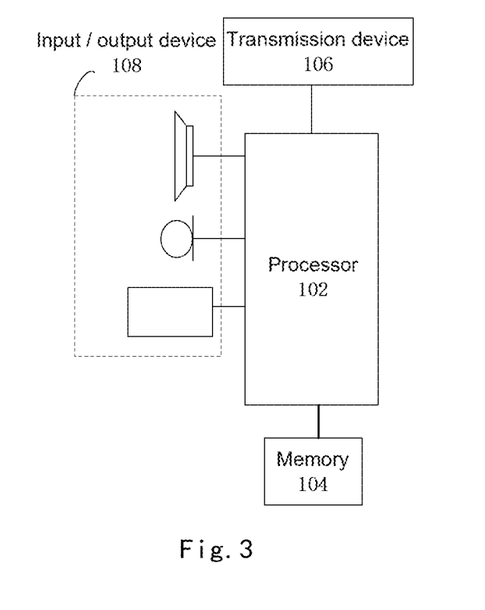
FIG. 3 is a hardware structure diagram of a mobile terminal of a networking signal sending method for a positioning network in the embodiment of the present disclosure.

An embodiment of a method provided by the Embodiment 1 of the present disclosure can be executed in a mobile terminal, a computer terminal or similar arithmetic devices. Taking operation on the mobile terminal as an example, FIG. 3 is a hardware structure diagram of a mobile terminal of a networking signal sending method for a positioning network in the embodiment of the present disclosure. As shown in FIG. 3, the mobile terminal can include one or more (only one is shown in FIG. 3) processors 102 (the processors 102 can include but not limited to MCUs or FPGAs or other processing devices) and a memory 104 for storing data, and In an embodiment, the mobile terminal can include transmission equipment 106 for a communication function and input and output equipment 108. Common technical personnel in the art can understand that the structure shown in FIG. 3 is only schematic and does not cause limitation for the structure of the above mobile terminal. For example, the mobile terminal 10 can further include more or fewer assemblies shown in FIG. 3, or can have configurations different from those shown in FIG. 3.

The memory 104 can be used for storing computer programs such as software programs and modules of application software and computer programs corresponding to a message receiving method in the embodiment of the present disclosure, and the processor 102 executes various function applications and data processing by operating the computer programs stored in the memory 104, so that the above method is achieved. The memory 104 can include a high-speed random access memory and can further include a nonvolatile memory, such as one or more magnetic memories, flash memories or other nonvolatile solid state memories. In some examples, the memory 104 can further include memories remotely set relative to the processor 102, and the remote memories can be connected to the mobile terminal 10 through a network. The examples of the above network include but not limited to an internet, an intranet, a local area network, a mobile communication network and a combination of the internet, the intranet, the local area network, the mobile communication network.

The transmission equipment 106 is used for receiving or sending data through one network. A specific example of the above network can include a wireless network provided by a communication supplier of the mobile terminal 10. In one example, the transmission equipment 106 includes a Network INterface CoNtroller (NIC), and the NIC can be connected with other network equipment through the base station so as to communicate with the internet. In one example, the transmission equipment 106 can be a Radio FrequeNcy (RF) module used for communicating with the internet in a wireless manner.

Figure 4:
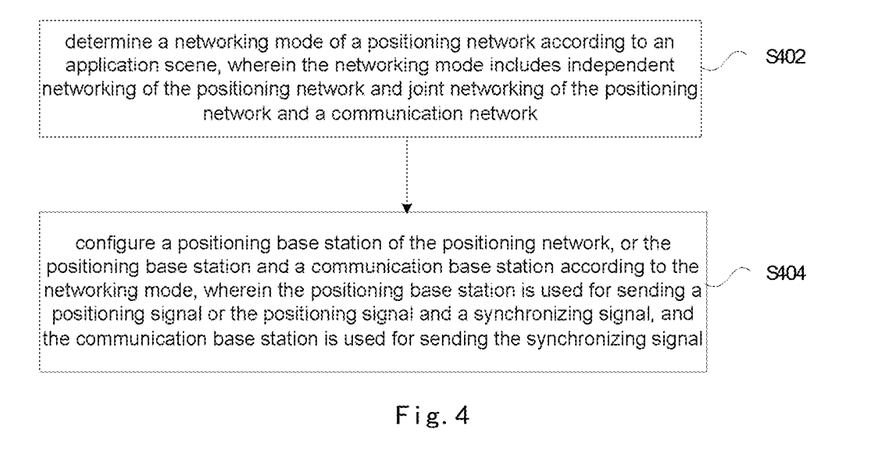
FIG. 4 is a flow chart of the networking signal sending method for the positioning network in the embodiment of the present disclosure.

Based on the above mobile terminal, the embodiment provides a networking signal sending method for a positioning network. FIG. 4 is a flow chart of the networking signal sending method for the positioning network according to the embodiment of the present disclosure. As shown in FIG. 4, the process includes following steps:

S402: determining a networking mode of the positioning network according to an application scene, wherein the networking mode includes independent networking of the positioning network and joint networking of the positioning network and a communication network; in the embodiment of the present invention, the application scene includes a first scene with a positioning requirement and a communication requirement for the wireless network and a second scene with a positioning requirement only for the wireless network, correspondingly, the step S402 specifically can include that if the application scene is the first scene, the networking mode is determined as joint networking of the positioning network and the communication network, and if the application scene is the second scene, the networking mode is determined as independent networking of the positioning network; and S404: configuring a positioning base station of the positioning network, or the positioning base station and a communication base station according to the networking mode, wherein the positioning base station is used for sending a positioning signal or the positioning signal and a synchronization signal, the communication base station is used for sending the synchronization signal, in the embodiment of the present invention, the step S404 specifically can include that if the networking mode is independent networking of the positioning network, a positioning signal resource, positioning signal parameters and synchronization signal parameters are configured to the positioning base station, wherein the positioning base station is used for generating the synchronization signal according to the synchronization signal parameters and sending the synchronization signal on a pre-regulated resource: the positioning signal is generated according to the positioning signal parameters and the positioning signal resource, and the positioning signal is sent on the positioning signal resource; if the networking mode is joint networking of the positioning network and the communication network, the positioning signal resource is configured to the positioning base station and the communication base station, and the positioning signal parameters are configured to the positioning base station, wherein the communication base station is used for sending the synchronization signal, and no signals are sent on the configured positioning signal resource; and the positioning base station is used for generating the positioning signal according to the positioning signal parameters and the positioning signal resource and sending the positioning signal on the positioning signal resource.

By means of the steps from S402 to S404, the problems that the base station layout density is increased and the networking cost is increased due to communication base station positioning in the related technologies can be solved. The positioning base station of the positioning network is used for sending the positioning signal so that positioning function networking can be independently finished, the positioning base station and the communication base station can be networked in a joint mode, so that networking flexibility of the positioning network is kept, and positioning base station positioning has lower networking cost and positioning precision compared with communication base station positioning.

In the embodiment of the present invention, the positioning signal resource at least includes a time and frequency mapping pattern, a transmitting period, a continuous transmitting resource number, a continuous transmitting frequency and a resource initial position.

In the embodiment of the present invention, the positioning signal parameters at least include positioning signal ID and a suffix type of cyclic prefix (CP).

In the embodiment of the present invention, the synchronization signal parameters at least include CELL ID, bandwidth parameters, subcarrier interval and initial frequency point position.

In the embodiment of the present invention, the communication base station is a base station for sending wireless signals necessary for a communication service, and the positioning base station is a base station only sending wireless signals necessary for positioning.

Figure 5:
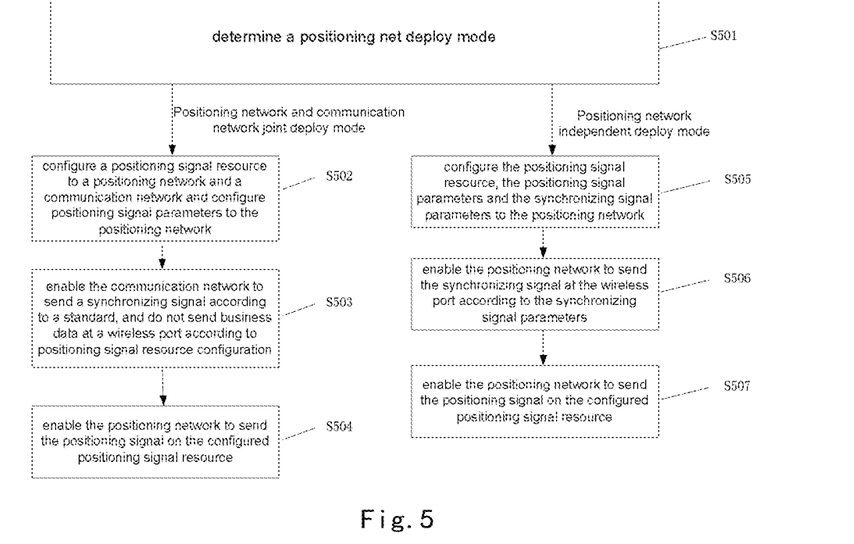
FIG. 5 is a flow chart of positioning network networking signal configuration and transmitting of the embodiment of the present invention.
Figure 6:
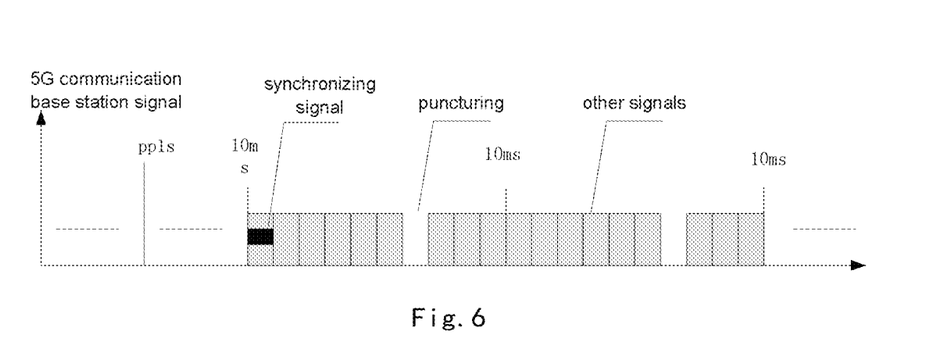
FIG. 6 is a schematic diagram of signals transmitted by the communication base station according to a joint networking mode.
Figure 7:
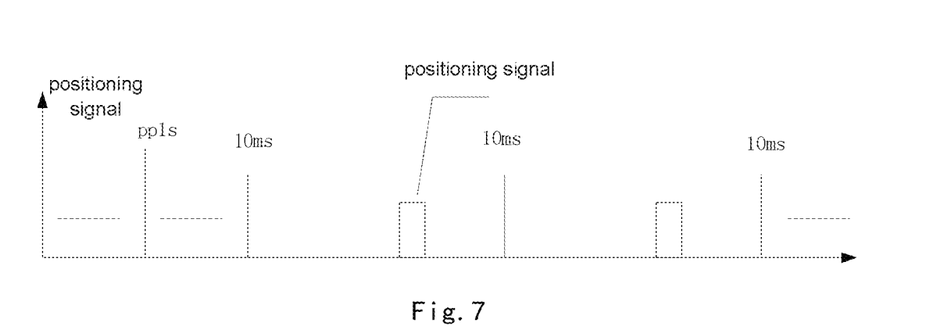
FIG. 7 is a schematic diagram of positioning signals transmitted by the positioning network according to the joint networking mode.
Figure 8:
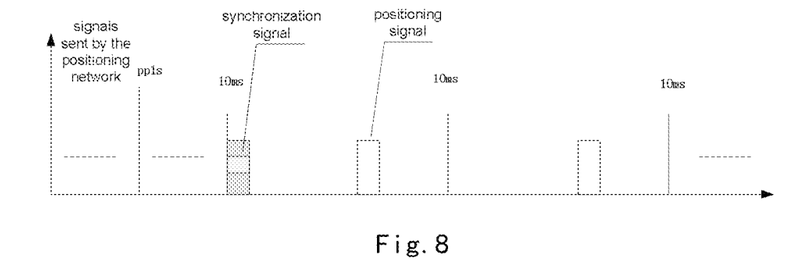
FIG. 8 is a schematic diagram of signals transmitted by the positioning network according to an independent networking mode of the embodiment of the present disclosure.

FIG. 5 is a flow chart of positioning network networking signal configuration and emission of the embodiment of the present invention. As shown in FIG. 5, the process includes:

S501: determining a deploy mode of the positioning network, wherein specifically, the networking mode of the positioning network is determined according to the application scene, if the positioning network is in the independent networking mode, the step S505 is executed, and if the positioning network is in the joint networking mode of the positioning network and the communication network, the step S502 is executed:

S502: configuring the positioning signal resource to the positioning network and the communication network and configuring the positioning signal parameters to the positioning network;

S503: enabling the communication network to send a communication signal (the synchronization signal is included) according to a standard, and not sending business data at a wireless port according to positioning signal resource configuration, wherein FIG. 6 is a schematic diagram of signals transmitted by the communication base station according to the joint networking mode, as shown in FIG. 6, the positioning signal resource is configured to the positioning base station of the positioning network and the communication base station of the communication network, the positioning signal parameters are configured to the positioning base station of the positioning network, the communication base station of the communication network sends the synchronization signal and other signals necessary for communication, and the signals are not sent during puncturing according to positioning signal resource configuration;

S504: enabling the positioning network to send the positioning signal on the configured positioning signal resource, wherein FIG. 7 is a schematic diagram of the positioning signal transmitted by the positioning network according to the joint networking mode, as shown in FIG. 7, the positioning base station of the positioning network generates the positioning signal according to the positioning signal parameters and the allocated resource, and the positioning signal is sent on the configured positioning signal resource:

S505: configuring the positioning signal resource, the positioning signal parameters and the synchronization signal parameters to the positioning network;

S506: enabling the positioning network to send the synchronization signal at the wireless port according to the synchronization signal parameters; and S507: enabling the positioning network to send the positioning signal on the configured wireless resource, wherein FIG. 8 is a schematic diagram of signals transmitted by the positioning network according to an independent networking mode of the embodiment of the present disclosure, and as shown in FIG. 8, the positioning base station of the positioning network generates the synchronization signal according to the synchronization signal parameters and sends the synchronization signal on the standard regulated resource.

The embodiment of the present disclosure is described in detail with specific embodiments as below.

Example 1

When a 5G communication network and a positioning network are in a joint networking mode, positioning network networking signal configuration and sending include following steps:

Step 1: configuring the positioning signal resource and the positioning signal parameters to the positioning base station of the positioning network, and configuring the positioning signal resource to the positioning base station:

1) PRS sending period $$T_{per}^{PRS} = 160$$

time slot (80 ms);
2) time slot $$T_{offset}^{PRS} = 40$$

time slot (20 ms); and
3) continuous sending subframe number $N_{PRS}$=4,
wherein the positioning signal parameters include but not limited to:
1) cyclic prefix type: standard cyclic prefix;
2) time slot number:

$$n_{s,f}^{\mu} = 0, 1;$$

3) PRS ID $$n_{ID,eq}^{PRS} = 0, 1, 2, 3, 4, 5, 6, 7, 8, 9, 10, 11$$

which are totally 12 base stations;
4) comb size:

$$K_{comb}^{PRS} = 12;$$

5) PRS resource symbol number $$L_{PRS} = 12;$$

6) PRS start symbol:

$$l_{start}^{prs} = 2;$$

7) resource element offset:

$$K_{offset}^{PRS} = 0;$$

9) bandwidth BW=100 MHz; and
10) subcarrier interval SCS=30 kHz,
wherein element offset k' on each symbol is shown as Table 1, and the above parameters meet a 3gpp standard specification;

TABLE 1

| 1 | 2 | 3 | 4 | 5 | 6 | 7 | 8 | 9 | 10 | 11 | 12 | 13 |
|---|---|---|---|---|---|---|---|---|----|----|----|----|
| k' | 0 | 6 | 3 | 9 | 1 | 7 | 4 | 10 | 2 | 8 | 5 | 11 |

Step 2: enabling the communication base station of the communication network to send the synchronization signal and other signals necessary for communication, and enabling signals not to be sent during puncturing according to positioning signal resource configuration, wherein the 5G synchronization signal sending process includes:

1) physical cell number defining,
wherein NR defines 1008 physical cell numbers $$\left(N_{ID}^{cell}\right),$$

and $$N_{ID}^{cell} = 3N_{ID}^{(1)} + N_{ID}^{(2)}, N_{ID}^{(1)} \in \{0, 1, \ldots, 335\}, N_{ID}^{(2)} \in \{0, 1, 2\};$$

2) primary synchronization signal (PSS) sequence generation,
wherein PSS is located at 127 subcarriers in the middle of a first symbol of SSB and generated by m sequence, please see the R16 standard in detail for the specific generation process, and the generation mode is as follows:

$d_{pss}(n)=1-2x(m)$, wherein $$\begin{cases} 0 \le n < 127 \\ m = \left(n + 43 N_{ID}^{(2)}\right) \bmod 127 \end{cases};$$

a shifting register: x(i+7)=(x(i+4)+x(i)) mod 2; and
an initial state: [x(6) x(5) x(4) x(3) x(2) x(1) x(0)]=[1 1 1 1 0 1 1 0];

3) secondary synchronization signal (SSS) sequence generation,
wherein SSS is located at 127 subcarriers in the middle of a second symbol of SSB and generated by Gold sequence, please see the R16 standard in detail for the specific generation process, and the generation mode is as follows:

$d_{sss}(n)=[1-2x_0(n+m_0) \bmod 127][1-2x_1(n+m_1) \bmod 127]$, $0 \leq n \leq 127$;

offset of two m sequences is:

$$\begin{cases} m_0 = 15\left\lfloor \frac{N_{ID}^{(1)}}{112} \right\rfloor + 5N_{ID}^{(2)} \\ m_1 = N_{ID}^{(1)} \bmod 112 \end{cases};$$

a shifting register: $x_0(i+7)=(x_0(i+4)+x_0(i)) \bmod 2$ and $x_1(i+7)=(x_1(i+1)+x_1(i)) \bmod 2$;

an initial state:

$[x_0(6) \, x_0(5) \, x_0(4) \, x_0(3) \, x_0(2) \, x_0(1) \, x_0(0)]=[0\,0\,0\,0\,0\,0\,1]$ and $[x_1(6) \, x_1(5) \, x_1(4) \, x_1(3) \, x_1(2) \, x_1(1) \, x_1(0)]=[0\,0\,0\,0\,0\,0\,1]$.

4) PBCH DMRS signal generation, wherein PBCH DMRS is located from the first symbol to the third symbol of SSB, totally 144 subcarriers, PBCH DMRS signals are generated by a pseudorandom sequence namely a Gold sequence common for an NR physical layer, please see the R16 standard in detail for the specific generation process, and the generation mode is as follows:

$$r(m) = \frac{1}{\sqrt{2}}(1-2c(2m)) + j\frac{1}{\sqrt{2}}(1-2c(2m+1));$$

composition through two m sequences:
$c(n)=(x_1(n+N_c)+x_2(n+N_c)) \bmod 2$, 其中 $N_c=1600$.

a shifting register:

$$x_1(n+31) = (x_1(n+3) + x_1(n)) \bmod 2$$
$$x_2(n+31) = (x_2(n+3) + x_2(n+2) + x_2(n+1) + x_2(n)) \bmod 2;$$

an initial state:
$x_1(0)=1$, $x_1(n)=0$, $n=1, 2, \ldots, 30$.

$$x_2 = 2^{11}(i_{SSB}+1)\left(\left\lfloor \frac{N_{ID}^{cell}}{4} \right\rfloor + 1\right) + 2^6(i_{SSB}+1) + (N_{ID}^{cell} \bmod 4)$$

Figure 9:
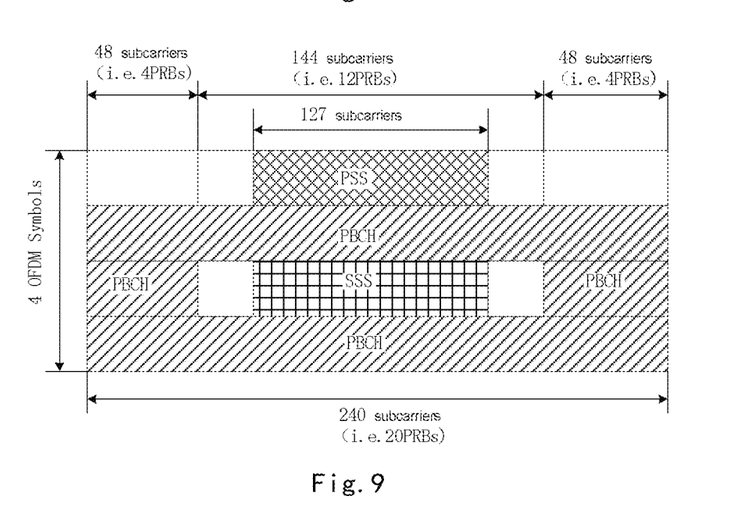
FIG. 9 is a schematic diagram of SSB composition according to the embodiment of the present disclosure.

5) PBCH bear information generation, wherein PBCH is located from the first symbol to the third symbol of SSB, totally 432 subcarriers, bome system information is totally 32 bits and includes following parts:

a 23-bit main information block (MIB): system high-6-bit frame number, SSB subcarrier interval, specific value of subcarrier offset, DMRS specific position and the like;

1-bit choice: indicating whether present is extended MIB information (for forward compatibility) or not; and 8-bit extraneous information: low-4-bit frame number, half-frame instruction and SSB index; and the specific processing process of bit information includes but not limited to following steps:

initial bit information generation and bit interleaving, CRC adding, Polar encoding, rate matching, QPSK modulating and the like;

6) secondary synchronizing block (SSB) generation, wherein SSB is composed of four OFDM symbols in time domain and occupies 20 PRB (namely 240 subcarriers) in frequency domain, FIG. 9 is a schematic diagram of SSB composition according to the embodiment of the present disclosure, as shown in FIG. 9, frequency domain positions of PSS, SSS and PBCH are fixed, frequency domain positions of PBCH DMRS offset according to the physical cell number, wherein $$v = N_{ID}^{cell}$$

mod 4, and the SSB resource allocation situation is shown as Table 2;

TABLE 2

| Signal | Symbol position in SS block | Subcarrier position in SS block | Occupied subcarrier number |
|---|---|---|---|
| PSS | 0 | 56, 57, . . . , 182 | 127 |
| SSS | 2 | 56, 57, . . . , 182 | 127 |
| Configured to 0 | 0 | 0, 1, . . . , 55, 183, 184, . . . , 239 | 113 |
| | 2 | 48, 49, . . . , 55, 183, 184, . . . , 191 | 17 |
| PBCH | 1, 3 | 0, 1, . . . , 239 | 240 * 2 |
| | 2 | 0, 1, . . . , 47, 192, 193, . . . , 239 | 96 |
| DM-RS for PBCH | 1, 3 | 0 + v, 4 + v, 8 + v, . . . , 236 + v | 60 * 2 |
| | 2 | 0 + v, 4 + v, 8 + v, . . . , 44 + v 192 + v, 196 + v, . . . , 236 + v | 24 |

7) SSB time and frequency domain position mapping:

period, wherein the NR standard regulated period can be 5 ms, 10 ms, 20 ms, 40 ms, 80 ms and 160 ms, and the default is 20 ms;

frequency band, wherein NR assigns two major frequency ranges: FR1 with the frequency band being 6 GHz or below: 450 MHz-6.0 GHz, and supported maximum channel bandwidth 100 MHz; and millimeter wave frequency band FR2: 24.25 GHz-52.6 GHz, and supported maximum channel bandwidth 400 MHz;

subcarrier interval, wherein NR defines four subcarrier intervals: 15 kHz, 30 kHz, 120 kHz and 240 kHz;

SS Burst Set, wherein one SS Burst Set is included in one period, all SSBs are located in the same half-frame (5 ms) and transmitted at the same antenna port, different SSBs have different SSB indexes, the maximum SSB number $L_{max}$ in one period decided by frequency f, wherein f≤3 GHz, $L_{max}=4$; 3 GHz<f<6 GHz, $L_{max}=8$; and f≥6 GHz, $L_{max}=64$; and time domain position mapping, wherein the SSB time domain position is decided by subcarrier interval and the frequency range, and the specific relation is shown in Table 3; and

TABLE 3

| Subcarrier interval | First symbol position of SS Block | F <= 3 GHz | 3 GHz < f < 6 GHz | f > 6 GHz |
|---|---|---|---|---|
| A: 15 kHz | {2, 8} + 14*n | n = 0, 1 | n = 0, 1, 2, 3 | N/A |
| B: 30 kHz | {4, 8, 16, 20} + 28 * n | n = 0 | n = 0, 1 | N/A |
| C: 30 kHz | {2, 8} + 14 * n | n = 0, 1 | n = 0, 1, 2, 3 | N/A |
| D: 120 kHz | {4, 8, 16, 20} + 28 * n | N/A | N/A | n = 0, 1, . . . , 18 |
| E: 240 kHz | {8, 12, 16, 20, 32, 36, 40, 44} + 56 * n | N/A | N/A | n = 0, 1, 3, 5, 6, 7, 8 |

Figure 10:
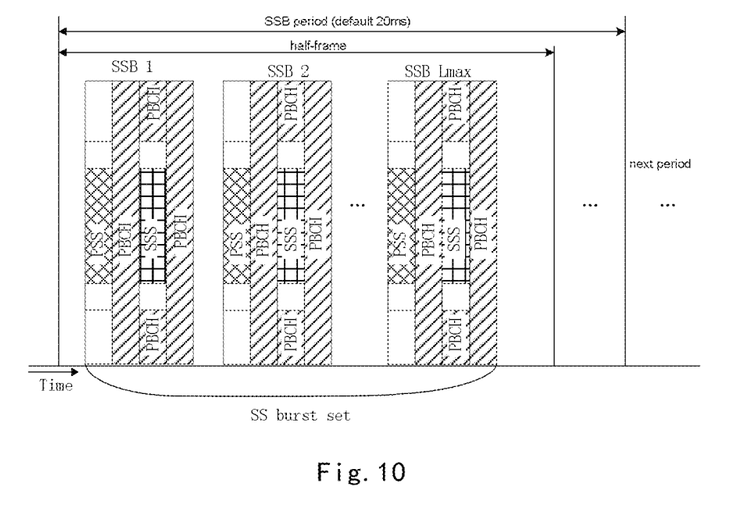
FIG. 10 is a structural schematic diagram of synchronization signal sending according to the embodiment of the present disclosure.
Figure 11:
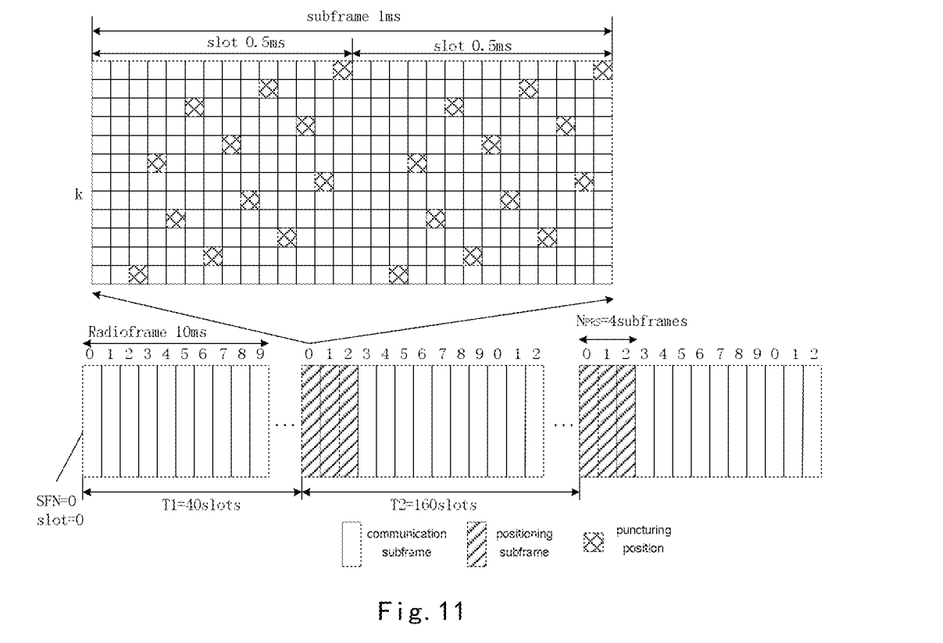
FIG. 11 is a schematic diagram of communication base station puncturing according to the embodiment of the present disclosure.
Figure 12:
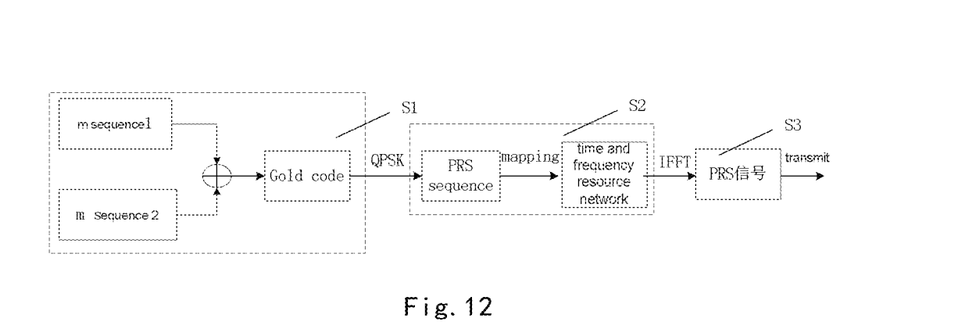
FIG. 12 is a flow chart of PRS generation according to the embodiment of the present disclosure.

8) synchronization signal generation,
wherein FIG. 10 is a structural schematic diagram of synchronization signal sending according to the embodiment of the present disclosure, as shown in FIG. 10, after time and frequency domain position mapping, the sent synchronization signal can be generated. FIG. 11 is a schematic diagram of communication base station puncturing according to the embodiment of the present disclosure, and as shown in FIG. 11, for communication network puncturing, puncturing in corresponding positions is conducted when the communication network sends small signals according to the time and frequency resource position of the positioning signal configured by the positioning network; and Step 3: enabling the positioning base station of the positioning network to generate the positioning signal according to the positioning signal parameters and the allocated resource and sending the positioning signal on the configured positioning signal resource, wherein FIG. 12 is a flow chart of PRS generation according to the embodiment of the present disclosure, and as shown in FIG. 12, the process includes:

S1: Gold code generating through m sequence 1 and m sequence 2, and Gold code generating through the following mode:

$c(n)=(x_1(n+N)+x_2(n+N_c))$ mod 2
$x_1(n+31)=(x_1(n+3)+x_1(n))$ mod 2
$x_2(n+31)=(x_2(n+3)+x_2(n+2)+x_2(n+1)+x_2(n))$ mod 2;

The length of c(n) is M, n=0, . . . , M−1, $N_c$=1600, $x_1(0)$=1, $x_1(n)$=0, n=1, 2, . . . , 30; and $x_2(n)$ initial value $c_{init}=x_2(1)\cdot 20+x_2(1)\cdot 21+ \ldots +x_2(30)\cdot 2^{30}$ S2: PRS pilot frequency sequence generating and time and frequency resource mesh mapping, wherein the PRS pilot frequency sequence is obtained by QPSK modulating on the Gold code, and the process is specifically conducted through the following mode:

$$r_{l,n_s}(m) = \frac{1}{\sqrt{2}}(1 - 2c(2m)) +$$

$$j\frac{1}{\sqrt{2}}\left(1 - 2c(2m+1), m = 0, 1, \ldots, 2N_{RB}^{PRS} - 1; c_{init}\left(2^{22}\left\lfloor\frac{n_{ID,seq}^{PRS}}{1024}\right\rfloor\right.\right. +$$

$$2^{10}\left(N_{symb}^{slot}n_{s,f}^{\mu} + l + 1\right)\left(2\left(n_{ID,seq}^{PRS}\text{mod }1024\right) + 1\right) + \left(n_{ID,seq}^{PRS}\text{mod }1024\right)\right) \text{mod } 2^{31}$$

$m = 0, 1, \ldots$ ;

$k = mK_{comb}^{PRS} + \left(\left(k_{offset}^{PRS} + k'\right) \text{mod } K_{comb}^{PRS}\right);$ $l = l_{start}^{PRS}, l_{start}^{PRS} + 1, \ldots, l_{start}^{PRS} + L_{PRS} - 1_\circ$ S3: PRS signal generation, wherein Inverse Fast Fourier Transform (IFFT) is carried out on a pilot frequency sequence on each symbol on a resource grid.

Figure 13:
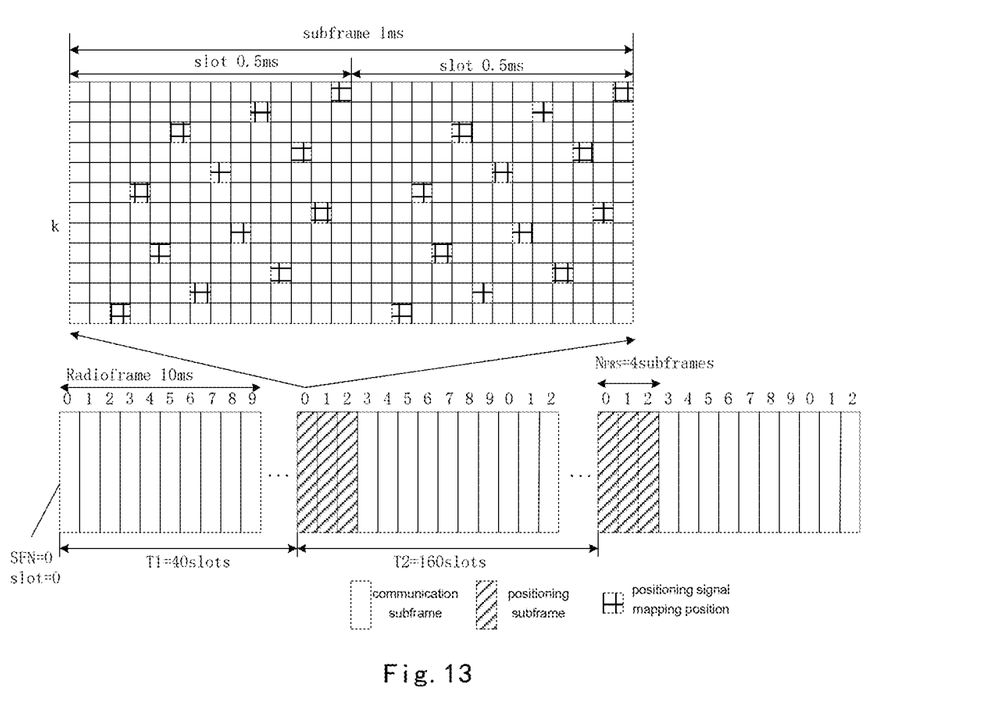
FIG. 13 is a schematic diagram of a positioning signal transmitted by the base station according to the embodiment of the present disclosure.

FIG. 13 is a schematic diagram of the positioning signal transmitted by the base station according to the embodiment of the present disclosure; and as shown in FIG. 13, PRS ID $$n_{ID,seq}^{PRS} = 0$$

base station sent positioning signal, time slot offset $$T_{offset}^{PRS} = 40$$

(corresponding to T1 in FIG. 13) and PRS sending period $$T_{per}^{PRS} = 160$$

time slot (80 ms, and corresponding to T1 in FIG. 13).

Example 2

In a 5G independent positioning network networking mode, positioning network networking signal configuration and sending include following steps:

Step 1: configuring the positioning signal resource, the positioning signal parameters and the synchronization signal parameters to the positioning base station of the positioning network, and configuring the positioning signal resource to the positioning base station:
bandwidth BW=100 MHz;
subcarrier interval SCS=30 kHz
PRS sending period $$T_{per}^{PRS} = 160$$

time slot (80 ms);
time slot offset $$T_{offset}^{PRS} = 40$$

time slot (20 ms); and continuous sending subframe number $$N_{PRS} = 4,$$

wherein the positioning signal parameters include but not limited to:
cyclic prefix type: standard cyclic prefix;
time slot number $$n_{s,f}^{\mu} = 0$$

PRS ID $$n_{ID,seq}^{PRS} = 0 = 0, 1, 2, 3, 4, 5, 6, 7, 8, 9, 10, 11$$

which are totally 12 base stations;
comb size:

$$K_{comb}^{PRS} = 12;$$

PRS resource symbol number $$L_{PRS} = 12;$$

PRS start symbol:

$$l_{start}^{prs} = 2;$$

and
resource element offset:

$$K_{offset}^{PRS} = 0;$$

wherein element offset k' on each symbol is shown as Table 4.

TABLE 4

| 1 | 2 | 3 | 4 | 5 | 6 | 7 | 8 | 9 | 10 | 11 | 12 | 13 |
|---|---|---|---|---|---|---|---|---|----|----|----|----|
| k' | 0 | 6 | 3 | 9 | 1 | 7 | 4 | 10 | 2 | 8 | 5 | 11 |

The above parameters meet a 3gpp standard specification.

Step 2: enabling the positioning base station of the positioning network to generate the synchronization signal according to the synchronization signal parameters and sending the synchronization signal on the standard regulated resource, wherein the 5G synchronization signal sending process includes:

1) physical cell number defining,
wherein NR defines 1008 physical cell numbers $$(N_{ID}^{cell}), N_{ID}^{cell} = 3N_{ID}^{(1)} + N_{ID}^{(2)},$$

and $$N \; N_{ID}^{(1)} \in \{0, 1, \ldots, 335\}, N_{ID}^{(2)} \in \{0, 1, 2\}.$$

2) primary synchronization signal (PSS) sequence generation,
wherein PSS is located at 127 subcarriers in the middle of a first symbol of SSB and generated by m sequence, please see the R16 standard in detail for the specific generation process,
and the generation mode is as follows: $d_{pss}(n)=1-2x(m)$, wherein $$\begin{cases} 0 \le n < 127 \\ m = (n + 43N_{ID}^{(2)}) \bmod 127 \end{cases};$$

a shifting register: x(i+7)=(x(i+4)+x(i)) mod 2; and
an initial state: [x(6) x(5) x(4) x(3) x(2) x(1) x(0)]=[1 1 1 0 1 1 0 1].

3) secondary synchronization signal (SSS) sequence generation,
wherein SSS is located at 127 subcarriers in the middle of a second symbol of SSB and generated by Gold sequence, please see the R16 standard in detail for the specific generation process, and the generation mode is as follows:

$$d_{sss}(n) = [1 - 2x_0(n + m_0) \bmod 127][1 - 2x_1(n + m_1) \bmod 127], \; 0 \le n < 127;$$

offset of two m sequences:

$$d_{sss}(n) = [1 - 2x_0(n + m_0) \bmod 127][1 - 2x_1(n + m_1) \bmod 127],$$

$$0 \le n < 127; \begin{cases} m_0 = 15 \left\lfloor \dfrac{N_{ID}^{(1)}}{112} \right\rfloor + 5N_{ID}^{(2)} \\ m_1 = N_{ID}^{(1)} \bmod 112 \end{cases};$$

a shifting register:

$$x_0(i + 7) = (x_0(i + 4) + x_0(i)) \bmod 2$$
$$x_1(i + 7) = (x_1(i + 1) + x_1(i)) \bmod 2;$$

an initial state:
[$x_0(6) \; x_0(5) \; x_0(4) \; x_0(3) \; x_0(2) \; x_0(1) \; x_0(0)$]=[0 0 0 0 0 0 1];
[$x_1(6) \; x_1(5) \; x_1(4) \; x_1(3) \; x_1(2) \; x_1(1) \; x_1(0)$]=[0 0 0 0 0 0 1].

4) PBCH DMRS signal generation,
wherein PBCH DMRS is located from the first symbol to the third symbol of SSB, totally 144 subcarriers, PBCH DMRS signals are generated by a pseudorandom sequence namely a Gold sequence common for an NR physical layer, please see the R16 standard in detail for the specific generation process, and the generation mode is as follows:

$$r(m) = \frac{1}{\sqrt{2}}(1-2c(2m)) + j\frac{1}{\sqrt{2}}(1-2c(2m+1));$$

composition through two m sequences: c(n)=(x$_1$(n+N$_c$)+x$_2$(n+N$_c$)) mod 2, 其中 N$_c$=1600.
a shifting register:

$$x_1(n+31) = (x_1(n+3) + x_1(n)) \bmod 2$$
$$x_2(n+31) = (x_2(n+3) + x_2(n+2) + x_2(n+1) + x_2(n)) \bmod 2;$$

an initial state:

$$x_1(0) = 1, x_1(n) = 0, n = 1, 2, \ldots, 30$$

$$x_2 = 2^{11}(i_{SSB}+1)\left(\left[\frac{N_{ID}^{cell}}{4}\right]+1\right) + 2^6(i_{SSB}+1) + (N_{ID}^{cell} \bmod 4)$$

5) PBCH bear information generation,
wherein PBCH is located from the first symbol to the third symbol of SSB, totally 432 subcarriers, bome system information is totally 32 bits and includes following parts:
a 23-bit main information block (MIB): system high-6-bit frame number, SSB subcarrier interval, specific value of subcarrier offset, DMRS specific position and the like;
1-bit choice: indicating whether present is extended MIB information (for forward compatibility) or not; and
8-bit extraneous information: low-4-bit frame number, half-frame instruction and SSB index; and
the specific processing process of bit information includes but not limited to following steps:
initial bit information generation and bit interleaving, CRC adding, Polar encoding, rate matching, QPSK modulating and the like;
6) secondary synchronizing block (SSB) generation,
wherein SSB is composed of four OFDM symbols in time domain and occupies 20 PRB (namely 240 subcarriers) in frequency domain, SSB composition is shown in FIG. 9, frequency domain positions of PSS, SSS and PBCH are fixed, frequency domain positions of PBCH DMRS offset according to the physical cell number, wherein $$v = N_{ID}^{cell}$$

mod 4, and the SSB resource allocation situation is shown as Table 2:
7) SSB time and frequency domain position mapping:
period, wherein the NR standard regulated period can be 5 ms, 10 ms, 20 ms, 40 ms, 80 ms and 160 ms, and the default is 20 ms;
frequency band, wherein NR assigns two major frequency ranges: FR1 with the frequency band being 6 GHz or below: 450 MHz-6.0 GHz, and supported maximum channel bandwidth 100 MHz; and millimeter wave frequency band FR2: 24.25 GHz-52.6 GHz, and supported maximum channel bandwidth 400 MHz;
subcarrier interval, wherein NR defines four subcarrier intervals: 15 kHz, 30 kHz, 120 kHz and 240 kHz;
SS Burst Set, wherein one SS Burst Set is included in one period, all SSBs are located in the same half-frame (5 ms) and transmitted at the same antenna port, different SSBs have different SSB indexes,
the maximum SSB number L$_{max}$ in one period decided by frequency f, wherein f≤3 GHz, L$_{max}$=4; 3 GHz<f<6 GHz, L$_{max}$=8; and f≥6 GHz, L$_{max}$=64; and
time domain position mapping, wherein the SSB time domain position is decided by subcarrier interval and the frequency range, and the specific relation is shown in Table 3; and
8) synchronization signal generation,
wherein after time and frequency domain position mapping, the generated synchronization signal can be generated, and a specific structure is shown in FIG. 10; and
Step 3: enabling the positioning base station of the positioning network to generate the positioning signal according to the positioning signal parameters and the allocated resource and sending the positioning signal on the configured wireless resource, as shown in FIG. 12, PRS generation includes:
S1: Gold code generation:
c(n)=(x$_1$(n+N$_c$)+x$_2$(n+N$_c$)) mod 2;
x$_1$(n+31)=(x$_1$(n+3)+x$_1$(n)) mod 2;
x$_2$(n+31)=(x$_2$(n+3)+x$_2$(n+2)+x$_2$(n+1)+x$_2$(n)) mod 2;
c(n)长度为 M, n=0, . . . , M−1, N$_c$=1600, x$_1$(0)=1 x$_1$(n)=0, x$_1$(n)=0, n=1, 2, . . . , 30。x$_2$(n) 的初始值为 c$_{init}$=x$_2$(0)·2$^0$+x$_2$(1)·2$^1$+ . . . +x$_2$(30)·2$^{30}$;
S2: PRS pilot frequency sequence generating and time and frequency resource mesh mapping,
wherein the PRS pilot frequency sequence is obtained by QPSK modulating on the Gold code with any length, and the length of the Gold code is larger than that of the pilot frequency sequence by 2 times, $$r_{l,n_s}(m) = \frac{1}{\sqrt{2}}(1-2c(2m)) + j\frac{1}{\sqrt{2}}(1-2c(2m+1)),$$

$$m = 0, 1, \ldots, 2N_{RB}^{PRS}-1;$$

$$c_{init} = \left(2^{22}\left\lfloor\frac{n_{ID,seq}^{PRS}}{1024}\right\rfloor + 2^{10}(N_{symb}^{slot}n_{s,f}^{\mu}+1+1)(2(n_{ID,seq}^{PRS} \bmod 1024)+1) + (n_{ID,seq}^{PRS} \bmod 1024)\right) \bmod 2^{31};$$

$$a_{k,l}^{(p,\mu)} = \beta_{PRS}r(m);$$

$$m = 0, 1, \ldots;$$

$$k = mK_{comb}^{PRS} + ((k_{offset}^{PRS} + k') \bmod K_{comb}^{PRS});$$

$$l = l_{start}^{PRS}, l_{start}^{PRS}+1, \ldots, l_{start}^{PRS}+L_{PRS}-1.$$

S3: PRS signal generation, wherein Inverse Fast Fourier Transform (IFFT) is carried out on a pilot frequency sequence on each symbol on a resource grid.

By means of the description of the above implementing modes, technical personnel in the art can clearly know that the method according to the above embodiments can be achieved by means of software and necessary universal hardware platforms and also can be achieved through hardware, but the former is the better implementing mode under many situations. Based on the understanding, the technical scheme of the present disclosure or parts making contribution to the prior art can be essentially embodied in the form of software products, and a computer software product is stored in one storage medium (such as ROM/RAM, a magnetic disk and a light disk) and includes a plurality of instructions to enable terminal equipment which can be a mobile phone, a computer, a server or network equipment to execute the methods in the embodiments of the present disclosure.

Embodiment 2

The embodiment further provides a networking signal sending device for a positioning network. The device is used for achieving the above embodiments and the preferable implementing mode and is explained and not repeated. The term 'module' used as below can achieve combination of software and/or hardware with a preset function. Devices described by the following embodiments are preferably achieved by the software, but it can be possible and is conceived for implementing through hardware or combination of the software and the hardware.

Figure 14:
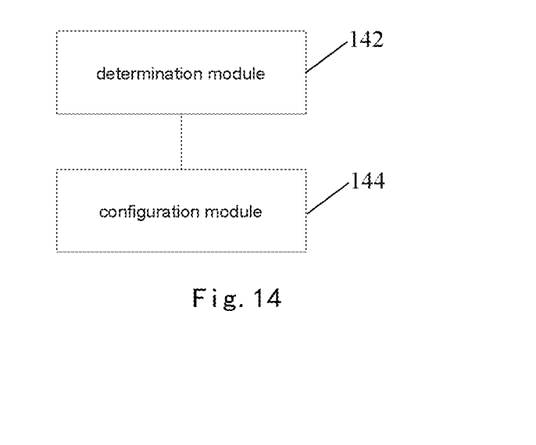
FIG. 14 is a flow diagram of a networking signal sending device for the positioning network according to the embodiment of the present disclosure.

FIG. 14 is a flow diagram of the networking signal sending device for the positioning network according to the embodiment of the present disclosure, and as shown in FIG. 14, the networking signal sending device is applied to an Internet of Things enhancing platform and includes:
- a determination module 142 configured to determine a networking mode of a positioning network according to an application scene, wherein the networking mode includes independent networking of the positioning network and joint networking of the positioning network and a communication network; and
- a configuration module 144 configured to configure a positioning base station of the positioning network, or the positioning base station and a communication base station according to the networking mode, wherein the positioning base station is used for sending a positioning signal or the positioning signal and a synchronization signal, and the communication base station is used for sending the synchronization signal.

In an embodiment, the configuration module 144 includes:
- a first configuration unit set in the mode that if the networking mode is independent networking of the positioning network, a positioning signal resource, positioning signal parameters and synchronization signal parameters are configured to the positioning base station, wherein the positioning base station is used for generating the synchronization signal according to the synchronization signal parameters and sending the synchronization signal on a pre-regulated resource; and the positioning signal is generated according to the positioning signal parameters and the positioning signal resource, and the positioning signal is sent on the positioning signal resource; and
- a second configuration unit set in the mode that if the networking mode is joint networking of the positioning network and the communication network, the positioning signal resource is configured to the positioning base station and the communication base station, and the positioning signal parameters are configured to the positioning base station, and no signals are sent on the configured positioning signal resource; and the positioning base station is used for generating the positioning signal according to the positioning signal parameters and the positioning signal resource and sending the positioning signal on the positioning signal resource.

In an embodiment, the application scene includes a first scene with a positioning requirement and a communication requirement for a wireless network and a second scene with a positioning requirement only for the wireless network.

In an embodiment, the determination module 142 includes:
- a first confirming unit configured to determine the networking mode as joint networking of the positioning network and the communication network if the application scene is the first scene; and
- a second confirming unit configured to determine the networking mode as independent networking of the positioning network if the application scene is the second scene.

In an embodiment, the positioning signal resource at least includes a time and frequency mapping pattern, a transmitting period, a continuous transmitting resource number, a continuous transmitting frequency and a resource initial position.

In an embodiment, the positioning signal parameters at least include positioning signal ID and a suffix type of cyclic prefix (CP).

In an embodiment, the synchronization signal parameters at least include CELL ID, bandwidth parameters, subcarrier interval and initial frequency point position.

In an embodiment, the communication base station is a base station for sending wireless signals necessary for the communication service; and the positioning base station is a base station only sending wireless signals necessary for positioning.

It needs to be explained that the above modules can be achieved through software or hardware, and for the latter, the modules can be achieved but not limited through the following mode that the above modules are all located in the same processor: or the above modules are located in different processors in the form of any combinations.

Embodiment 3

The embodiment of the present disclosure further provides a computer readable storage medium, and the storage medium stores computer programs, wherein the computer programs are configured to execute steps in the embodiment of any above method during operation.

In an embodiment, the storage medium in the embodiment can be configured to store the computer programs for executing the following steps:
- S11: determining a networking mode of a positioning network according to an application scene, wherein the networking mode includes independent networking of the positioning network and joint networking of the positioning network and a communication network, and
- S12: configuring a positioning base station of the positioning network, or the positioning base station and a communication base station according to the networking mode, wherein the positioning base station is used for sending a positioning signal or the positioning signal and a synchronization signal, and the communication base station is used for sending the synchronization signal.

In an embodiment, the storage medium can include but not limited to a U disk, a Read-ONly Memory (ROM), a RaNdom Access Memory (RAM), a mobile hard disk, a magnetic disk or a light disk or other media capable of storing the computer programs.

Embodiment 4

The embodiment of the present disclosure further provides an electronic device including a memory and a processor, wherein the memory stores computer programs, and the processor is configured to operate the computer programs so as to execute steps in the embodiment of any above method.

In an embodiment, the electronic device can include transmission equipment and input and output equipment, the transmission equipment is connected with the processor, and the input and output equipment is connected with the processor.

In an embodiment, the processor can be configured to execute the following steps through the computer programs:

S11: determining a networking mode of a positioning network according to an application scene, wherein the networking mode includes independent networking of the positioning network and joint networking of the positioning network and a communication network; and S12: configuring a positioning base station of the positioning network, or the positioning base station and a communication base station according to the networking mode, wherein the positioning base station is used for sending a positioning signal or the positioning signal and a synchronization signal, and the communication base station is used for sending the synchronization signal.

In an embodiment, specific examples in the embodiment can refer to the examples described in the above embodiments or the selective implementing modes, and the embodiment is not repeated herein.

Obviously, technical personnel in the art should understand that the modules and steps in the present disclosure can be achieved through a universal computing device, can be centralized in the single computing device or distributed in a network formed by multiple computing devices, optionally, the modules and steps can be achieved by program codes capable of being executed by the computing device so that the modules and steps can be stored in a storage device to be executed by the computing device, the shown or described steps can be executed in sequence different from the sequence herein under some situations or the steps can be made into various integrated circuit modules, or more of the modules or steps can be made into single integrated circuit modules to be achieved. Thus, the present disclosure is not limited to any specific hardware and software combination.

The above embodiments are merely preferable embodiments of the present disclosure and not used for limiting the present disclosure, and the present disclosure can be variously modified and changed for technical personnel in the art. Any modification, equivalent replacement, improvement, etc. made within the principle of the present disclosure shall fall within the scope of protection of the present disclosure.

INDUSTRIAL APPLICABILITY

The embodiment of the present disclosure is applied to the field of communication and can solve the problems that the base station layout density is increased and the networking cost is increased due to communication base station positioning in the related technologies. The positioning base station of the positioning network is used for sending the positioning signal so that positioning function networking can be independently finished, the positioning base station and the communication base station can be networked in a joint mode, so that networking flexibility of the positioning network is kept, and positioning base station positioning has lower networking cost and higher positioning precision compared with communication base station positioning.

What is claimed is:

1. A networking signal sending method for a positioning network, comprising:

determining a networking mode of the positioning network according to an application scene, wherein the networking mode comprises independent networking of the positioning network and joint networking of the positioning network and a communication network, wherein a communication base station of the communication network is a base station for sending wireless signals necessary for a communication service, the positioning base station of the positioning network is a base station only for sending wireless signals necessary for positioning;

in a case that the networking mode is independent networking of the positioning network, configuring a positioning signal resource, positioning signal parameters and synchronization signal parameters to the positioning base station, wherein the positioning base station is used for generating the synchronization signal according to the synchronization signal parameters and sending the synchronization signal on a pre-regulated resource, generating the positioning signal according to the positioning signal parameters and the positioning signal resource, and sending the positioning signal on the positioning signal resource; and in a case that the networking mode is joint networking of the positioning network and the communication network, configuring the positioning signal resource to the positioning base station and the communication base station, configuring the positioning signal parameters to the positioning base station, using the communication base station for sending the synchronization signal, and not sending signals on the configured positioning signal resource; and using the positioning base station for generating the positioning signal according to the positioning signal parameters and the positioning signal resource and sending the positioning signal on the positioning signal resource.

2. The method according to claim 1, wherein the application scene comprises a first scene with a positioning requirement and a communication requirement for a wireless network and a second scene with a positioning requirement only for the wireless network.

3. The method according to claim 2, wherein determining the networking mode of the positioning network according to the application scene comprises:

when the application scene is the first scene, determining the networking mode as joint networking of the positioning network and the communication network, and when the application scene is the second scene, determining the networking mode as independent networking of the positioning network.

4. The method according to claim 1, wherein the positioning signal resource at least comprises a time and frequency mapping pattern, a transmitting period, a continuous transmitting resource number, a continuous transmitting frequency and a resource initial position.

5. The method according to claim 1, wherein the positioning signal parameters at least comprise positioning signal ID and a type of cyclic prefix (CP).

6. The method according to claim 1, wherein the synchronization signal parameters at least comprise: CELL ID, bandwidth parameters, subcarrier interval, initial frequency point position.

7. A networking signal sending device for a positioning network, comprising:
- a determination module, configured to determine a networking mode of a positioning network according to an application scene, wherein the networking mode comprises independent networking of the positioning network and joint networking of the positioning network and a communication network, wherein a communication base station of the communication network is a base station for sending wireless signals necessary for a communication service, the positioning base station of the positioning network is a base station only for sending wireless signals necessary for positioning; and
- a configuration module, configured to:
- in a case that the networking mode is independent networking of the positioning network, configure a positioning signal resource, positioning signal parameters and synchronization signal parameters to the positioning base station, wherein the positioning base station is used for generating the synchronization signal according to the synchronization signal parameters and sending the synchronization signal on a pre-regulated resource; generating the positioning signal according to the positioning signal parameters and the positioning signal resource, and sending the positioning signal on the positioning signal resource;
- in a case that the networking mode is joint networking of the positioning network and the communication network, configure the positioning signal resource to the positioning base station and the communication base station, configuring the positioning signal parameters to the positioning base station, using the communication base station for sending the synchronization signal, and not sending signals on the configured positioning signal resource; and using the positioning base station for generating the positioning signal according to the positioning signal parameters and the positioning signal resource and sending the positioning signal on the positioning signal resource.

8. A non-transitory computer readable storage medium, wherein the storage medium stores computer programs, and the computer programs are configured to perform the method as claimed in claim 1 during operation.

9. An electronic device comprising a memory and a processor, wherein the memory stores computer programs, and the processor is configured to execute the computer programs so as to perform the method as claimed in claim 1.

10. The method according to claim 2, wherein the communication base station is a base station for sending wireless signals necessary for a communication service, and the positioning base station is a base station only sending wireless signals necessary for positioning.

11. The method according to claim 3, wherein the communication base station is a base station for sending wireless signals necessary for a communication service, and the positioning base station is a base station only sending wireless signals necessary for positioning.

12. The method according to claim 4, wherein the communication base station is a base station for sending wireless signals necessary for a communication service, and the positioning base station is a base station only sending wireless signals necessary for positioning.

13. The method according to claim 5, wherein the communication base station is a base station for sending wireless signals necessary for a communication service, and the positioning base station is a base station only sending wireless signals necessary for positioning.

14. The method according to claim 6, wherein the communication base station is a base station for sending wireless signals necessary for a communication service, and the positioning base station is a base station only sending wireless signals necessary for positioning.

15. An electronic device comprising a memory and a processor, wherein the memory stores computer programs, and the processor is configured to execute the computer programs so as to perform the method as claimed in claim 2.

16. An electronic device comprising a memory and a processor, wherein the memory stores computer programs, and the processor is configured to execute the computer programs so as to perform the method as claimed in claim 3.

* * * * *